Figures 1, 2:
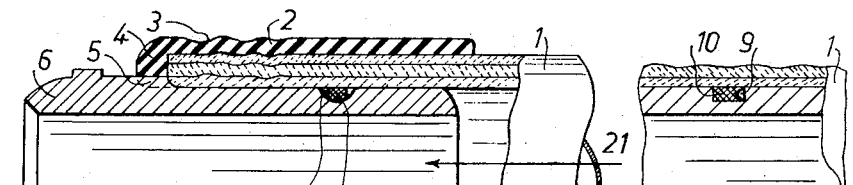

June 5, 1956 R. KAISER 2,749,150

HOSE END FITTING WITH SELF SEALING NIPPLE

Filed Nov. 21, 1952

Rudolf Kaiser

By
Townsend F. Beaman
Attorney

United States Patent Office 2,749,150
Patented June 5, 1956

2,749,150

HOSE END FITTING WITH SELF SEALING NIPPLE

Rudolf Kaiser, Ettlingen, Baden, Germany, assignor to Aeroquip Corporation, Jackson County, Mich., a corporation of Michigan Application November 21, 1952, Serial No. 321,776

Claims priority, application Germany November 26, 1951

1 Claim. (Cl. 285—77)

This invention relates to end fittings for use on flexible hose, including wire braid or other metallic reinforced hose, and which involve, essentially, a nipple which is adapted to be introduced into the bore of the hose from one end thereof.

The conventional hose end fittings comprise a nipple and an outer socket, through which socket the nipple is introduced, as by screwing, from one end of the previously applied socket so as to define an elongated annular cavity between the inside and the outside walls of the socket and nipple, respectively, in which cavity a corresponding portion of the hose is capable of being held, with these walls being formed not only to hold the end fitting against axial separating movement with respect to the hose end due to the axial thrust imposed thereon by the pressure fluid conducted through the hose, but being also formed to hold the hose portion in the cavity, by compression, so as effectively to seal the thus clamped hose end portion against leakage of fluid from the hose interior past the said end fitting wall surfaces. The construction of these known socket and nipple end fittings to serve the dual function of holding the end fitting onto the hose against axial separation therefrom, and of effectively sealing the thus held hose end portion against leakage of the fluid conducted through the hose bore, involves special machining and forming operations and also special assembling operations, which it is an object of this invention to eliminate by the provision of a simplified form of end fitting with which it is only necessary to hold the hose onto a nipple against the axial thrust exerted thereon by the conducted fluid and with which the required sealing condition is obtained by the employment of separate sealing means between the hose and the nipple. It may be pointed out that with the conventional hose end fittings, the forces necessary of application to the hose end portion to effectively seal it within the socket and nipple cavity are appreciably higher than are necessary of application to hold the end fitting onto the hose end against the axial thrust imposed by the conducted fluid.

It is an object of the present invention, therefore, to provide a hose end fitting which merely requires to be held onto the hose end portion against the forces imposed thereon by the pressure of the conducted fluid and with which effective sealing of the fluid with respect to the end fitting is accomplished separately by sealing means provided between the nipple and the hose.

The invention also has for its object to provide a simplified form and construction of hose end fitting which enables the conventional form of outer socket to be dispensed with, if desired.

The above, and further objects and advantages of the invention, residing in the combination, construction and arrangement of parts will become clear from a consideration of the following description of several forms of the invention, with reference to the accompanying drawings, and from the appended claim.

Figure 3:
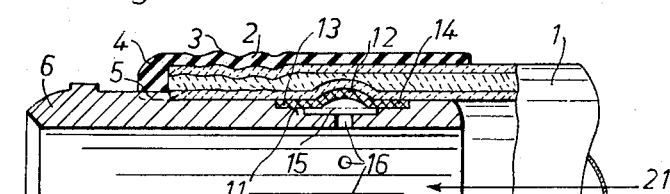
Figure 4:
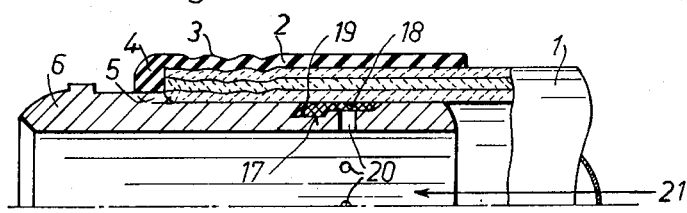
Figures 5, 6, 7:
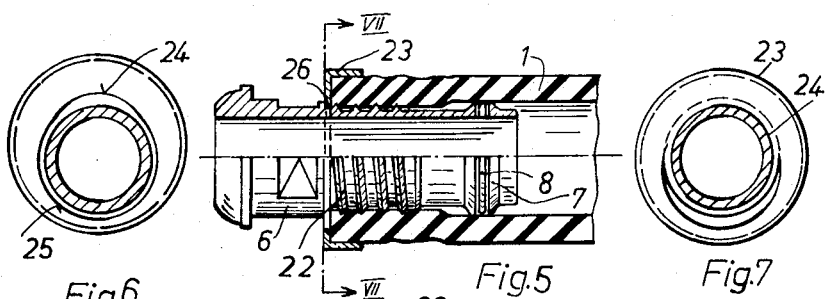
Figures 8, 9:
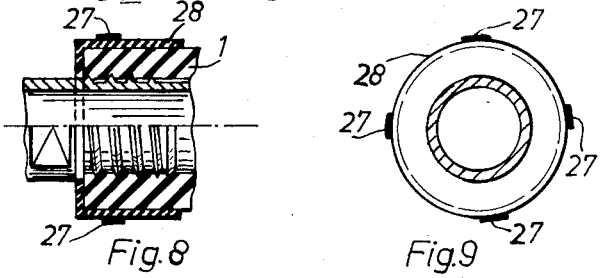

In the drawings:

Fig. 1 is a half longitudinal section of one form of hose end fitting in accordance with the invention, shown applied to a hose end portion, Fig. 2 is a fragmentary section illustrating an alternative nipple sealing ring, Figs. 3 and 4 are similar views to Fig. 1 illustrating different forms of the nipple sealing ring, Fig. 5 is a half longitudinal sectional and half elevational view illustrating a further form of the invention employing an outer socket in the form of a cup-shape ring, Fig. 6 shows in end view the cup-shape socket ring of Fig. 5 in its initial position of application, Fig. 7 is a cross section on the line VII—VII of Fig. 6, showing the cup-shape socket ring in its finally assembled applied position, Fig. 8 is a fragmentary longitudinal section illustrating yet a further form of the invention, and Fig. 9 is a cross section on the line VIII—VIII of Fig. 8.

Referring to the drawings, in which like parts have been given the same reference numerals, and dealing first with Figs. 1–4, 1 indicates a portion of flexible hose shown composed of inner and outer layers of rubber or rubber-like material and a central layer of wire braid, 2 an outer socket formed with a coarse screw thread 3 and an end annular flange 4 with an internal small-pitch screw thread 5, and 6 an inner nipple having external screw-threading for engagement with the socket threading 5. The nipple is inserted into position on the socket 2 and within the bore 21 of the hose by being screwed through the screw threaded opening presented by the previously applied socket flange 4.

For the purpose of sealing the hose applied fitting against leakage of fluid from the interior of the hose 1, the nipple itself is fitted with a sealing element which is capable of maintaining fluid sealing engagement between the nipple and the hose bore engaged with the nipple, the presence of which sealing ring renders it only necessary that the nipple and socket should exert sufficient compressive force upon the enclosed hose portion as to prevent axial separation of the fitting with respect to the hose due to the axial thrust forces exerted by pressure fluid conducted through the hose.

In Fig. 1 the sealing means is in the form of an O-ring 8 accommodated in an annular groove 7 around the exterior surface of the nipple 6. This sealing ring maintains a fluid seal between the hose and the nipple intermediate the ends of the hose portion enclosed and held between the nipple and the socket.

In Fig. 2 a similar arrangement of sealing ring is provided, with the sealing ring 10, however, being of channel section and arranged sideways in the annular nipple groove 9, i. e. with one side flange of the channel section sealing ring arranged in engagement with the bottom surface of the groove, the groove being of channel section to correspond with the sealing ring section.

In Fig. 3 the fluid sealing means is in the form of a sleeve 12 secured around its opposite end portions, as by vulcanizing, at 11 and 14, in an annular recess 15 formed around the outside of the nipple 6 and defining an annular space with the intermediate free portion of the sealing sleeve. This space is closed, except for the presence of holes 16 in the nipple, which holes enable the pressure fluid to flow into the annular space and force the intermediate sleeve portion into firm fluid sealing engagement with the interior of the hose intermediate the ends of the portion of the hose held between the socket and the nipple. In practice, the pressure fluid will produce an outward deformation of the intermediate portion of the sealing sleeve and consequential deformation of the interior layer of the hose 1, substantially as indicated in Fig. 3.

In Fig. 4 the sealing means is also in the form of a sleeve 18, but this sleeve is only secured around one end portion thereof, as indicated at 17, within an annular recess 19 formed around the nipple 6. The remainder of the sealing sleeve fits freely in the recess and is exposed to, and is free to be acted upon by the pressure fluid within the holes via the holes 20, in the nipple.

Fig. 5 shows a ring sealed nipple employed in association with a different and simple outer end cup which replaces the more elaborate socket of Figs. 1, 3 and 4. In Fig. 5 the nipple is shown with relatively coarse screw-threading 22 on its exterior surface, which permits the nipple to be screwed into the bore of the hose 1. Towards its inner end, beyond said screw-threading, the nipple is formed with an annular recess 7, in which recess the sealing ring 8 is located, the recess being formed so that portions of the ring 8 are exposed to the pressure fluid conducted along the hose. In this figure the conventional socket is dispensed with and a flanged end cup 23 is employed instead for securing over the exterior surface of the end portion of the hose. This end cup is formed with an end opening, a minor portion 24 of which is concentric to the end cup and the major portion 25 of which opening is eccentric, the opening being approximately of elliptical shape and enabling the end cup to be moved axially over the nipple and displaced perpendicularly with respect to the direction of such axial movement. In use, the end cup, positioned as shown in Fig. 6, may be moved axially to engage its peripheral cylindrical flange with the exterior surface of the hose and be displaced perpendicularly to position the edge portion of its opening portion 24 in secured engagement with nipple threading 22, as shown in Fig. 7.

Figs. 8 and 9 show an alternative form of flanged end cup 26, which may be of rubber or rubber-like material, and is provided on its exterior with identification strips 27.

In the various forms of the invention above described, and shown in the drawings, the provision of the separate sealing rings, or sleeves, renders it necessary that the force exerted upon the hose by the end fitting shall be merely that which is necessary to take care of the axial thrust imposed by the conducted pressure fluid.

Having thus described the invention, what is claimed as novel and it is desired to secure by Letters Patent is as follows:

In a hose end fitting, a nipple having an irregular outer surface defined by various radii for tight insertion in the hose bore axially from one end thereof, and a flanged end cup, said end cup having an enlarged end opening and a cylindrical flange extending over said one end, the internal diameter of said flange being substantially equal to the outer diameter of said hose a minor portion of the edge of said end opening being arcuate and concentric with said flange and having a first radius of curvature, a major portion of the edge of said end opening being arcuate and eccentric with said flange and having a second radius of curvature, said second radius of curvature being substantially greater than said first radius of curvature so that said nipple may be initially inserted in said end opening concentric with said major portion of the edge thereof and thereafter moved laterally relative to said end cup to a position concentric with said minor portion of the edge of said end opening to permit the end cup to be mounted upon the nipple with the peripheral cup flange engaged with the outer surface of the hose end and said minor portion held secured by the nipple against relative axial movement, the greatest radius of that portion of the nipple inserted in said end cup being intermediate said first and second radii of curvature whereby said hose end maintains said cup flange in said second concentric position with respect to said nipple.

References Cited in the file of this patent

UNITED STATES PATENTS

| | | |
|---|---|---|
| 511,138 | Hallas | Dec. 19, 1893 |
| 585,014 | Wenzel et al. | June 22, 1897 |
| 589,216 | McKee | Aug. 31, 1897 |
| 794,110 | McDowell | July 4, 1905 |
| 1,822,259 | Anderson | Sept. 8, 1931 |
| 1,965,426 | Nelson | July 3, 1934 |
| 1,996,855 | Cheswright | Apr. 9, 1935 |
| 2,264,815 | Thomson | Dec. 2, 1941 |
| 2,374,225 | Melsom | Apr. 24, 1945 |
| 2,453,997 | MacWilliam | Nov. 16, 1948 |
| 2,679,409 | Spender | May 25, 1954 |